(12) United States Patent
Hasegawa et al.

(10) Patent No.: US 8,780,977 B2
(45) Date of Patent: Jul. 15, 2014

(54) TRANSCODER

(75) Inventors: Hiromu Hasegawa, Osaka (JP); Makoto Saito, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1053 days.

(21) Appl. No.: 12/367,765

(22) Filed: Feb. 9, 2009

(65) Prior Publication Data

US 2009/0213929 A1  Aug. 27, 2009

(30) Foreign Application Priority Data

Feb. 26, 2008 (JP) ................................. 2008-043848

(51) Int. Cl.
  *H04N 7/12* (2006.01)
(52) U.S. Cl.
  USPC .................................................. 375/240.03
(58) Field of Classification Search
  USPC .................................................. 375/240.03
  See application file for complete search history.

(56) References Cited

U.S. PATENT DOCUMENTS

| | | | |
|---|---|---|---|
| 6,483,945 B1 | 11/2002 | Kato | |
| 6,590,936 B1 | 7/2003 | Kadono | |
| 6,915,018 B2 | 7/2005 | Tajime | |
| 7,173,947 B1 * | 2/2007 | Ramakrishnan et al. | 370/537 |
| 7,333,515 B1 * | 2/2008 | Ramakrishnan et al. | 370/487 |
| 7,397,855 B2 * | 7/2008 | Chen | 375/240.04 |
| 7,421,135 B2 | 9/2008 | Kondo et al. | |
| 7,953,281 B2 | 5/2011 | Yoshida et al. | |
| 7,984,179 B1 * | 7/2011 | Huang | 709/233 |
| 8,619,864 B2 * | 12/2013 | Saito et al. | 375/240.23 |
| 2005/0041689 A1 * | 2/2005 | Wu et al. | 370/477 |
| 2006/0067362 A1 * | 3/2006 | Ramakrishnan | 370/468 |
| 2006/0256861 A1 * | 11/2006 | Laksono et al. | 375/240.03 |
| 2007/0002946 A1 * | 1/2007 | Bouton et al. | 375/240.01 |
| 2007/0286289 A1 | 12/2007 | Arai et al. | |
| 2008/0031337 A1 | 2/2008 | Hasegawa et al. | |
| 2009/0009370 A1 | 1/2009 | Hasegawa et al. | |
| 2009/0225193 A1 | 9/2009 | Ishii | |

FOREIGN PATENT DOCUMENTS

| | | |
|---|---|---|
| JP | 11-98502 A | 4/1999 |
| JP | 11-285002 | 10/1999 |
| JP | 2001-78193 | 3/2001 |
| JP | 2001-186517 | 7/2001 |
| JP | 2001-204028 A | 7/2001 |
| JP | 2005-45736 | 2/2005 |

(Continued)

OTHER PUBLICATIONS

U.S. Appl. No. 12/995,826, filed Dec. 2, 2010, Hasegawa.
U.S. Appl. No. 12/360,350, filed Jan. 27, 2009, Hasegawa, et al.
U.S. Appl. No. 13/401,198, filed Feb. 21, 2012, Hasegawa, et al.

*Primary Examiner* — Michael Pyzocha
(74) *Attorney, Agent, or Firm* — Oblon, Spivak, McClelland, Maier & Neustadt, L.L.P.

(57) ABSTRACT

In a transcoder, a decoder decodes a stream and an encoder encodes the stream again. The encoder calculates the quantization step value by using an average period bit rate ($AS_n(M)$) of a first stream or an average period bit rate ($AC_n(M)$) of a second stream. Buffers store bit rates ($S_n$, $C_n$) of the first and second streams for M periods, respectively. The encoder uses the average period bit rate ($AS_n(M)$) of the first stream or then average period bit rate ($AC_n(M)$) of the second stream in any one of the periods M1, M2 and M3 among M periods.

20 Claims, 4 Drawing Sheets

(56) References Cited

FOREIGN PATENT DOCUMENTS

| JP | 2005-72995 | | 3/2005 |
|---|---|---|---|
| JP | 2005-159441 | A | 6/2005 |
| JP | 2005-252555 | A | 9/2005 |
| JP | 2006-74635 | | 3/2006 |
| JP | 2006-237847 | A | 9/2006 |
| JP | 2007-300593 | | 11/2007 |
| JP | 2008-42426 | | 2/2008 |

* cited by examiner

TRANSCODER

BACKGROUND OF THE INVENTION

1. Field of the Invention

The present invention relates to a transcoder for converting an input stream by decoding into a different output stream, and more particularly to a technique to appropriately control the amount of generated codes of the output stream toward a target bit rate.

2. Description of the Background Art

Images to be delivered on digital broadcasts, those to be stored in media such as DVDs and hard disks, and the like are compressed in accordance with various coding systems. The object for such compressions is to avoid constraint on a transmission band, increase the transmission speed, decrease the memory size, or the like.

There are various standards for image coding system, such as MPEG2 and H.264. And there is a case where the coding system is converted for the purpose of reducing the amount of codes in a coded image that is inputted, or the like. A transcoder once decodes the inputted coded image. Then, the transcoder codes the decoded image in a different coding system (or the same coding system) again. Thus, the transcoder controls a bit rate of an output stream.

Japanese Patent Application Laid Open Gazette No. 2006-74635 relates to a transcoder for converting an image compressed in a first compressive coding system into an image compressed in a second compressive coding system. This transcoder uses intermediate information generated during the decoding of the image compressed in the first compressive coding system to compress the image in the second compressive coding system.

The stream inputted into the transcoder includes various scenes. Included are scenes which cause degradation of image quality if a larger amount of codes are not allocated thereto, scenes which do not cause degradation of image quality even if a larger amount of codes are not allocated thereto, and the like. Therefore, the degree of difficulty in image compression significantly varies depending on the scene.

On the other hand, the purpose of code amount control is to keep the bit rate in a certain period constant, regardless of the degree of difficulty in image compression as discussed above. How long the period is, for which the bit rate is kept constant, depends on the band limiting of a channel, the requirements specification of a user for image quality, or the like.

Assuming that the band limiting of a channel is strict, for example, the response time of feedback in the code amount control needs to be set shorter. In other words, the period for which the bit rate is kept constant needs to be set shorter. Such a code amount control disadvantageously causes degradation of image quality.

Conversely, if priority is given to the image quality, the response time of feedback in the code amount control needs to be set longer. In other words, the period for which the bit rate is kept constant is set longer, and for the period, some degree of freedom is given to the bit rate, to increase the image quality. Since there is a possibility, however, that such a control locally increases or decreases the bit rate, there arise some cases where it is not compatible with the band limiting of the channel.

SUMMARY OF THE INVENTION

The present invention is intended for a transcoder for converting a first stream into a second stream. According to an aspect of the present invention, the transcoder comprises a part for acquiring a bit rate of a first stream per control unit time, a buffer for storing bit rates of a first stream in a plurality of past periods, a reference value calculation part for acquiring bit rates of a first stream in a selected period from bit rates of a first stream in the plurality of past periods which are stored in the buffer, to calculate a reference value of bit rates of a first stream in the selected period, and a quantization step value calculation part for calculating a quantization step value of a second stream by including the reference value of bit rates of a first stream in the selected period which is calculated by the reference value calculation part as a parameter.

Since a buffer period for the amount of codes used for calculation for the code amount control is variable, it is possible to control the amount of codes while making the amount of generated codes appropriate in accordance with the condition or the requirement.

According to another aspect of the present invention, the transcoder comprises a part for acquiring a bit rate of a converted second stream per control unit time, a buffer for storing bit rates of a second stream in a plurality of past periods, a reference value calculation part for acquiring bit rates of a second stream in a selected period from bit rates of a second stream in the plurality of past periods which are stored in the buffer, to calculate a reference value of bit rates of a second stream in the selected period, and a quantization step value calculation part for calculating a quantization step value of a second stream by including the reference value of bit rates of a second stream in the selected period which is calculated by the reference value calculation part as a parameter.

According to still another aspect of the present invention, the transcoder further comprises a changing part for changing the selected period for the reference value to be used by the quantization step value calculation part as the parameter at some midpoint in a transcoding operation.

It is thereby possible to adaptively make the amount of generated codes appropriate.

Therefore, it is an object of the present invention to appropriately control the amount of generated codes of the output stream toward a target bit rate while keeping the balance between the purpose of making the bit rate constant and the purpose of maintaining the image quality.

These and other objects, features, aspects and advantages of the present invention will become more apparent from the following detailed description of the present invention when taken in conjunction with the accompanying drawings.

DESCRIPTION OF THE PREFERRED EMBODIMENTS

{1. Overall Structure of Transcoder}

Figure 1:
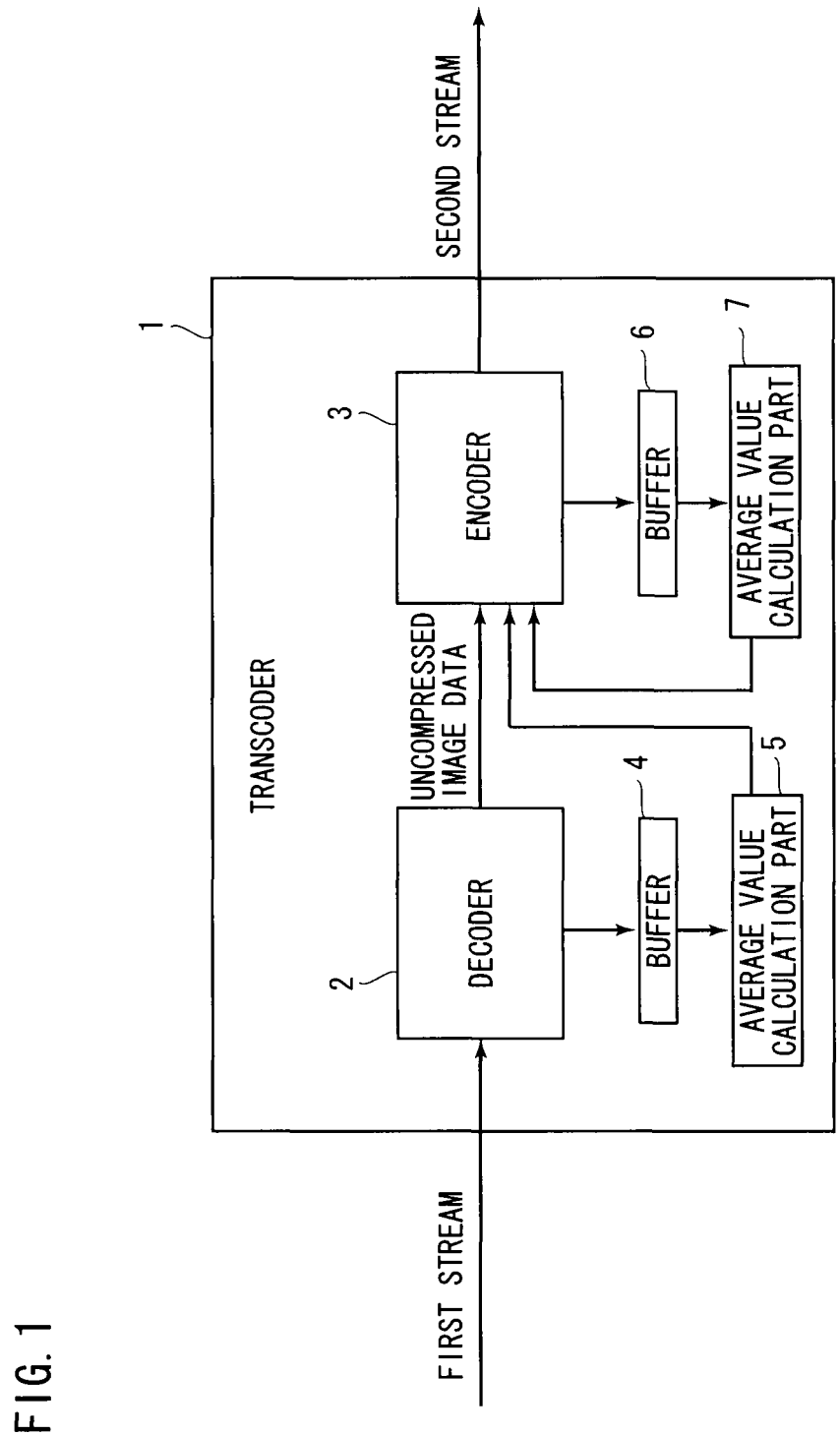
FIG. 1 is a block diagram showing a transcoder.

Hereinafter, the preferred embodiment of the present invention will be discussed, referring to the drawings. FIG. 1 is a block diagram showing a transcoder 1 in accordance with the preferred embodiment. The transcoder 1 comprises a decoder 2 and an encoder 3. The transcoder 1 further comprises a buffer 4, an average value calculation part 5, a buffer 6 and an average value calculation part 7.

The decoder 2 inputs a first stream. The first stream is a stream of coded image. The decoder 2 decodes the first stream and outputs uncompressed image data to the encoder 3. The encoder 3 recodes the uncompressed image data which is decoded by the decoder 2 and outputs a second stream.

The transcoder 1 converts a coding system of stream, and for example, inputs a first stream coded in MPEG2 and outputs a second stream coded in H.264. The present invention is devised in order to optimally control the rate of the second stream to be outputted in the conversion. Alternatively, the transcoder 1 outputs a stream of the same coding system, and for example, inputs a first stream coded in MPEG2 and outputs a second stream recoded in MPEG2. Also in this case, the present invention is devised in order to optimally control the rate of the second stream to be outputted.

In the rate control methods (A) to (D) discussed later, various computations are performed in the decoder 2, the encoder 3, the average value calculation parts 5 and 7 and the like, and these computations performed in the decoder 2, the encoder 3 and the average value calculation parts 5 and 7 may be implemented by hardware or may be implemented by software operations. In other words, these processing parts may be constructed as hardware circuits or implemented by a CPU and programs stored in memories. Alternatively, there may be a case where some of the computations are performed by hardware and the others are performed by software.

{2. Rate Control Methods}

Figure 2:
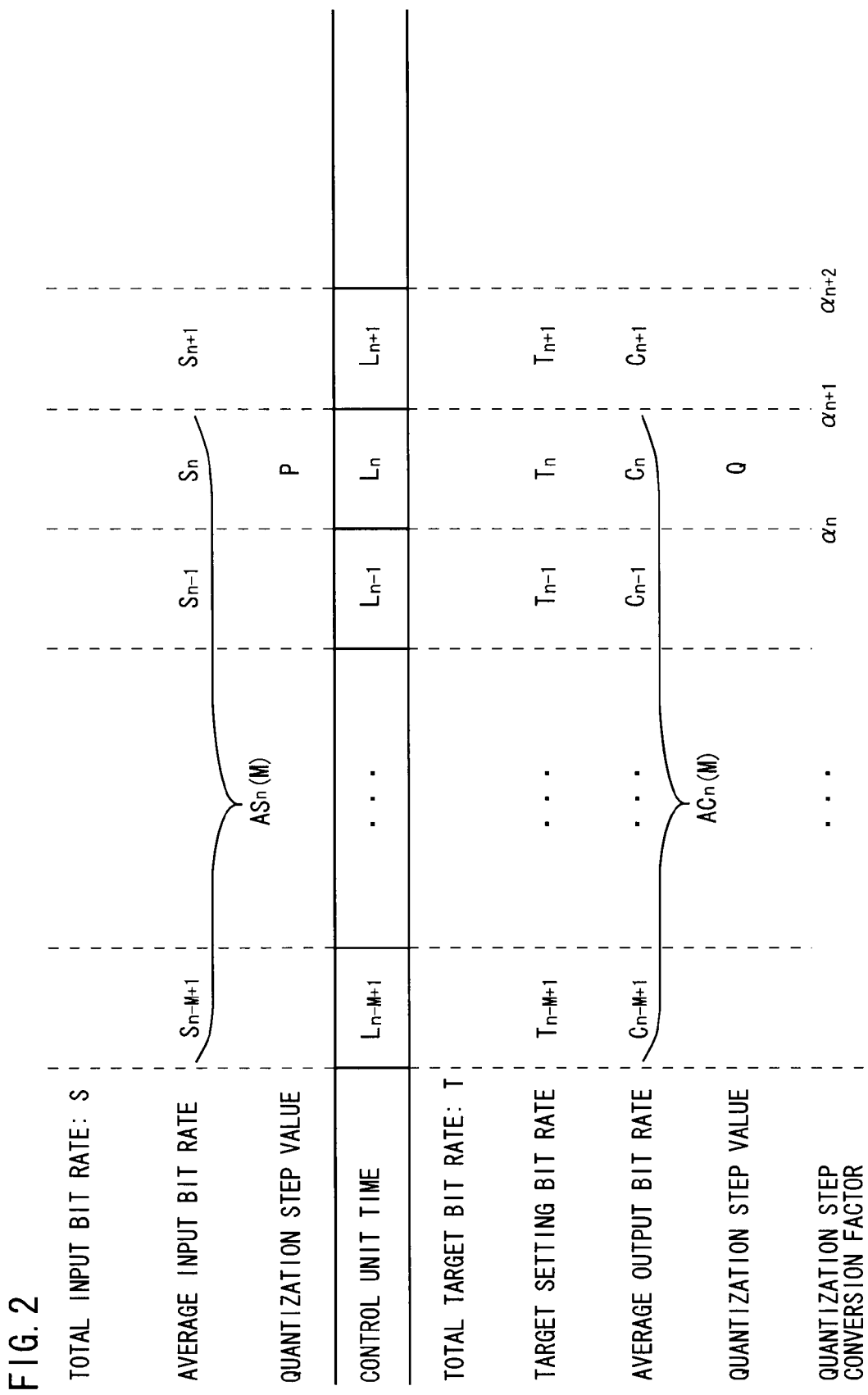
FIG. 2 is a view showing information on an input stream (first stream) and an output stream (second stream) by control unit time.

FIG. 2 is a view showing information on streams that the transcoder 1 inputs or outputs, by control unit time. The transcoder 1 divides the processing time base into control unit times $L_n$ (n=1, 2 . . . ) and performs a rate control by using this control unit time $L_n$ as a unit of processing. In the following discussion, the control unit time $L_n$ is referred to as "the n-th period" as appropriate. In the preferred embodiment of the present invention, one GOP is set as the control unit time $L_n$. As the control unit time $L_n$, however, a plurality of GOPs, one frame, a plurality of successive frames, or the like may be set.

A total input bit rate S of the first stream is acquired from a sequence header or the like. An average input bit rate $S_n$ is an average bit rate of the first stream in the n period. The transcoder 1 comprises the buffer 4 and can store information on average input bit rates $S_n$ for M periods. Specifically, the buffer 4 can store information on the average input bit rates $S_n$ from the (n−M+1) period to the n period. An average period bit rate $AS_n(M)$ is an average value of the average input bit rates $S_n$ from the (n−M+1) period to the n period. The average period bit rate $AS_n(M)$ is expressed by Eq. 1.

$$AS_n(M) = \frac{1}{M} \sum_{n-M+1}^{n} S_i \quad \text{(Eq. 1)}$$

The decoder 2 acquires information on the total input bit rate S, the average input bit rate $S_n$, the quantization step value P in the n period or the like from the inputted first stream and outputs these information to the encoder 3. The average value calculation part 5 outputs the average period bit rate $AS_n(M)$ to the encoder 3. The encoder 3 uses these information to recode the image.

A total target bit rate T of the second stream is set by a user. For example, the user uses a not-shown operation part included in the transcoder 1 to set the total target bit rate T. A target setting bit rate $T_n$ is a target bit rate of the second stream in the n period. An average output bit rate $C_n$ is an average bit rate of the second stream converted in the n period. The transcoder 1 comprises the buffer 6 and can store information on the average output bit rates $C_n$ for M periods. Specifically, the buffer 6 can store information on the average output bit rates $C_n$ from the (n−M+1) period to the n period. An average period bit rate $AC_n(M)$ is an average value of the average output bit rates $C_n$ from the (n−M+1) period to the n period. The average period bit rate $AC_n(M)$ is expressed by Eq. 2. Though the buffer period used for calculation of the average period bit rate $AS_n(M)$ or $AC_n(M)$ is linked to the control unit time $L_n$ in this preferred embodiment, setting of the buffer period is not limited to this case. For example, a plurality of successive past frames or the like may be set as the buffer period.

$$AC_n(M) = \frac{1}{M} \sum_{n-M+1}^{n} C_i \quad \text{(Eq. 2)}$$

Figure 3:
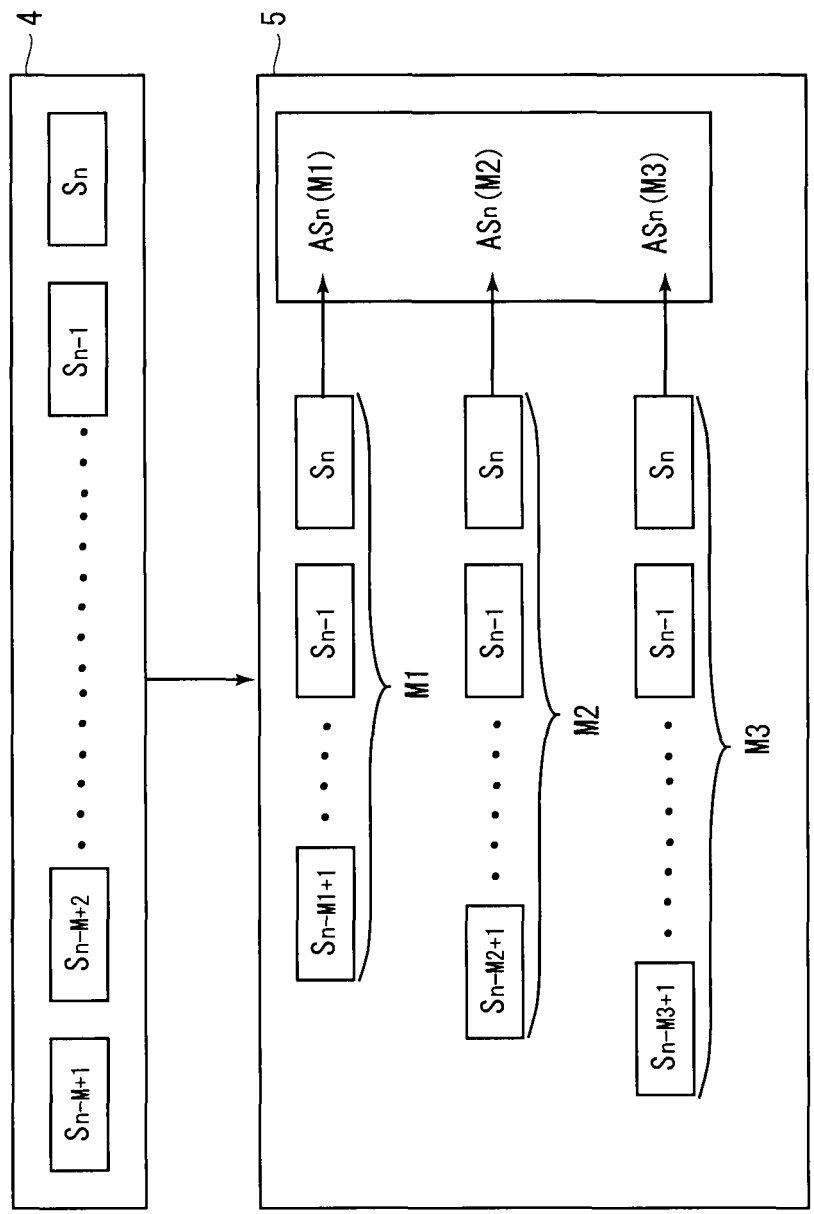
FIG. 3 is a view showing a buffer storing an average input bit rate and an average value calculation part.

FIG. 3 is a view showing average input bit rates $S_n$ stored in the buffer 4 and operations performed in the average value calculation part 5. The buffer 4 stores the average input bit rates $S_{n-M+1}$ to $S_n$ from the (n−M+1) period to the n period.

The average value calculation part 5 acquires the average input bit rates $S_n$ stored in the buffer 4, to calculate three types of average period bit rates $AS_n(M1)$, $AS_n(M2)$ and $AS_n(M3)$. The average period bit rate $AS_n(M1)$ is an average value for M1 periods, which is obtained by using the average input bit rates $S_{n-M1+1}$ to $S_n$. The average period bit rate $AS_n(M2)$ is an average value for M2 periods, which is obtained by using the average input bit rates $S_{n-M2+1}$ to $S_n$. The average period bit rate $AS_n(M3)$ is an average value for M3 periods, which is obtained by using the average input bit rates $S_{n-M3+1}$ to $S_n$. The average period bit rates $AS_n(M1)$, $AS_n(M2)$ and $AS_n(M3)$ are expressed by Eq. 3.

$$\begin{cases} AS_n(M1) = \frac{1}{M1} \sum_{n-M1+1}^{n} S_i \\ AS_n(M2) = \frac{1}{M2} \sum_{n-M2+1}^{n} S_i \\ AS_n(M3) = \frac{1}{M3} \sum_{n-M3+1}^{n} S_i \end{cases} \quad \text{(Eq. 3)}$$

As discussed later, the encoder 3 uses the average period bit rate $AS_n(M)$ to calculate the quantization step value Q of the second stream. At that time, any one of the average period bit rates $AS_n(M1)$, $AS_n(M2)$ and $AS_n(M3)$ is selected to be used as the average period bit rate $AS_n(M)$ in accordance with the setting by the user or on the basis of a predetermined condition.

Figure 4:
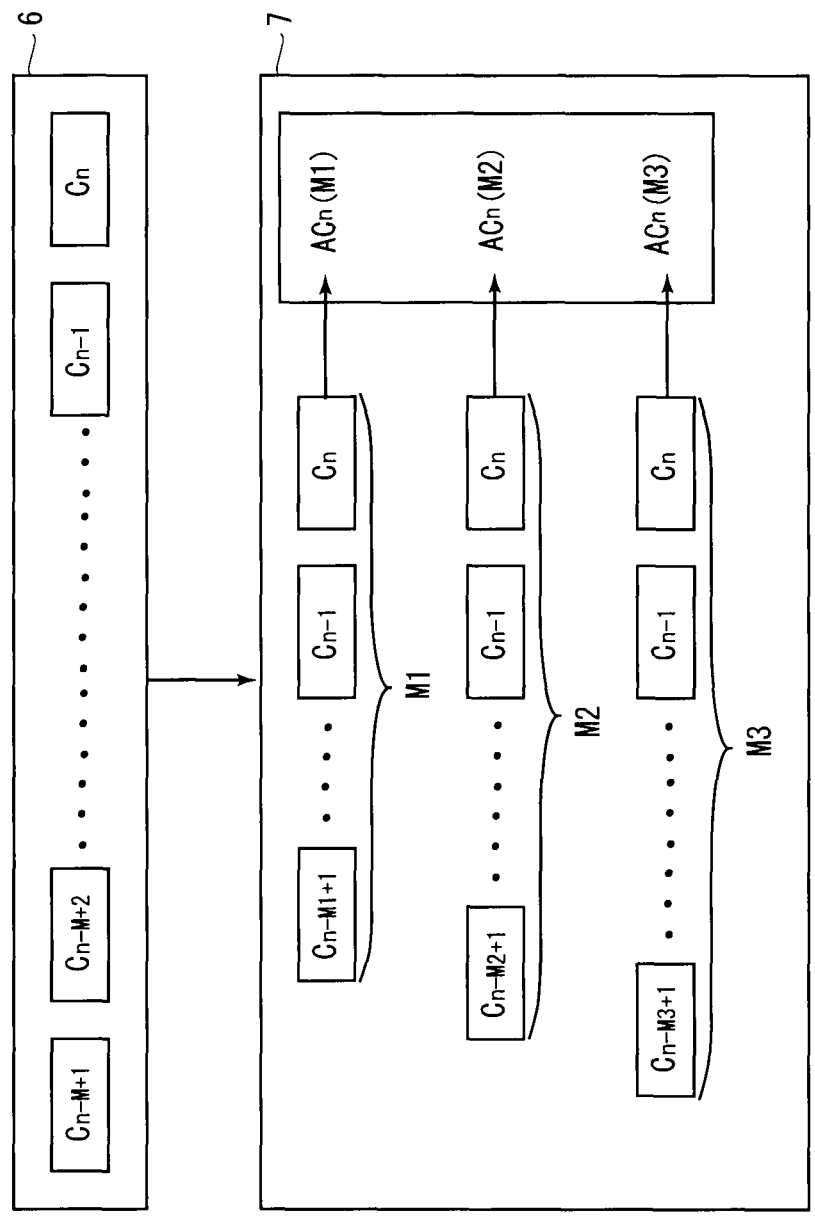
FIG. 4 is a view showing a buffer storing an average output bit rate and an average value calculation part.

FIG. 4 is a view showing average output bit rates $C_n$ stored in the buffer 6 and operations performed in the average value calculation part 7. The buffer 6 stores the average output bit rates $C_{n-M+1}$ to $C_n$ from the (n−M+1) period to the n period.

The average value calculation part 7 acquires the average output bit rates $C_n$ stored in the buffer 6, to calculate three types of average period bit rates $AC_n(M1)$, $AC_n(M2)$ and $AC_n(M3)$. The average period bit rate $AC_n(M1)$ is an average value for M1 periods, which is obtained by using the average output bit rates $C_{n-M1+1}$ to $C_n$. The average period bit rate $AC_n(M2)$ is an average value for M2 periods, which is obtained by using the average output bit rates $C_{n-M2+1}$ to $C_n$.

The average period bit rate $AC_n(M3)$ is an average value for M3 periods, which is obtained by using the average output bit rates $C_{n-M3+1}$ to $C_n$. The average period bit rates $AC_n(M1)$, $AC_n(M2)$ and $AC_n(M3)$ are expressed by Eq. 4.

$$\begin{cases} AC_n(M1) = \frac{1}{M1} \sum_{n-M1+1}^{n} C_i \\ AC_n(M2) = \frac{1}{M2} \sum_{n-M2+1}^{n} C_i \\ AC_n(M3) = \frac{1}{M3} \sum_{n-M3+1}^{n} C_i \end{cases} \quad \text{(Eq. 4)}$$

As discussed later, the encoder 3 uses the average period bit rate $AC_n(M)$ to calculate the quantization step value Q of the second stream. At that time, any one of the average period bit rates $AC_n(M1)$, $AC_n(M2)$ and $AC_n(M3)$ is selected to be used as the average period bit rate $AC_n(M)$ in accordance with the setting by the user or on the basis of a predetermined condition.

Referring back to FIG. 2, discussion will be continued. A quantization step conversion factor $\alpha_n$ is a factor calculated at the point of time when the (n−1) period is finished. The quantization step value Q of the second stream is determined by multiplying a value P which is the quantization step value of the first stream or a value P calculated from the quantization step value of the first stream by the quantization step conversion factor $\alpha_n$. This relation is expressed by Eq. 5.

$$Q = \alpha_n P \quad \text{(Eq. 5)}$$

The initial value $\alpha_1$ of the quantization step conversion factor $\alpha_n$ is given by Eq. 6. Specifically, a value obtained by dividing the total target bit rate T of the second stream by the total input bit rate S of the first stream, i.e., a bit rate ratio, is substituted into function f, to obtain the initial value $\alpha_1$ of the quantization step conversion factor $\alpha_n$.

$$\alpha_1 = f(T/S) \quad \text{(Eq. 6)}$$

The function f is a function for obtaining a ratio of quantization step values from the ratio of bit rates, and assuming that the ratio of bit rates is $R_B$ and the ratio of quantization step values is $R_Q$, the function f is generally expressed by Eq. 7.

$$R_Q = f(R_B) \quad \text{(Eq. 7)}$$

A specific example of the function f will be discussed. In this preferred embodiment, as shown in Eq. 8, used are functions controlling the ratio of quantization step values with different features of types I, P and B of picture (I picture, P picture and B picture) or macroblock. In Eq. 8, $f_I(x)$, $f_P(x)$ and $f_B(x)$ are functions corresponding to the I picture, the P picture and the B picture, respectively.

$$\begin{cases} f_I(x) = \varepsilon_I * x^{-\delta_I} = 2.1 * x^{-1.1} \\ f_P(x) = \varepsilon_P * x^{-\delta_P} = 2.1 * x^{-0.8} \\ f_B(x) = \varepsilon_B * x^{-\delta_B} = 1.3 * x^{-0.9} \end{cases} \quad \text{(Eq. 8)}$$

In Eq. 8, as values of $\varepsilon_I$, $\varepsilon_P$, $\varepsilon_B$, $\delta_I$, $\delta_P$ and $\delta_B$ in the case of stream conversion from MPEG2 into H.264, specific numerical values calculated on the basis of an experiment or the like are shown. Specifically, as the result of the experiment, when $\varepsilon_I=2.1$, $\varepsilon_P=2.1$, $\varepsilon_B=1.3$, $\delta_I=1.1$, $\delta_P=0.8$ and $\delta_B=0.9$, an excellent feature can be obtained. Other than this, by using the feature value of the image which is acquired in decoding the input stream, the values of $\varepsilon$ and $\delta$ may be determined. As shown in FIG. 9, for example, on the basis of an activity value (act value) and a motion evaluation value (sad value), the values of $\varepsilon$ and $\delta$ may be determined.

$$\begin{cases} f_I(x) = \varepsilon_I(a, s) * x^{-\delta_I(a,s)} \\ f_P(x) = \varepsilon_P(a, s) * x^{-\delta_P(a,s)} \\ f_B(x) = \varepsilon_B(a, s) * x^{-\delta_B(a,s)} \end{cases} \quad \text{(Eq. 9)}$$

In Eq. 9, "a" represents the act value and "s" represents the sad value, and $\varepsilon_I(a, s)$, $\varepsilon_P(a, s)$, $\varepsilon_B(a, s)$, $-\delta_I(a, s)$, $-\delta_P(a, s)$, $-\delta_B(a, s)$ represent the values of $\varepsilon$ and $\delta$ which are calculated by using the act value and the sad value as parameters.

The activity value is obtained by calculating a differential absolute value sum of an average pixel value in a macroblock and a pixel value of each pixel in the macroblock by macroblock. In other words, the activity value is an evaluation value indicating the degree of dispersion of pixels in the macroblock. This is the same as an activity value used in the code amount control model TM5 of MPEG2 or the like. The motion evaluation value (sad value) is obtained by calculating an interframe differential absolute value sum of a pixel value of each pixel in a reference image macroblock and a pixel value of the corresponding pixel in a macroblock, by macroblock. In other words, the motion evaluation value is obtained by comparing each pixel in a macroblock and the corresponding pixel in the reference image macroblock and calculating an absolute value sum of differentials of pixel values of corresponding pixels in the same coordinate positions.

More generally, assuming that an feature value of an image in the n period is determined as $I_{Ln}$, $f_I(x)$, $f_P(x)$ and $f_B(x)$ are expressed by Eq. 10.

$$\begin{cases} f_I(x) = \varepsilon_I(I_{L_n}) * x^{-\delta_I(I_{L_n})} \\ f_P(x) = \varepsilon_P(I_{L_n}) * x^{-\delta_P(I_{L_n})} \\ f_B(x) = \varepsilon_B(I_{L_n}) * x^{-\delta_B(I_{L_n})} \end{cases} \quad \text{(Eq. 10)}$$

In Eq. 10, $\varepsilon_I(I_{Ln})$, $\varepsilon_P(I_{Ln})$, $\varepsilon_B(I_{Ln})$, $-\delta_I(I_{Ln})$, $-\delta_P(I_{Ln})$ and $-\delta_B(I_{Ln})$ represent the factors $\varepsilon$ and $\delta$ which are determined by using the feature value $I_{Ln}$ of the image as parameters.

Hereafter, four rate control methods (A) to (D) will be discussed.

<2-1. Rate Control Method (A)>

First, on the rate control method (A), a method of calculating the quantization step conversion factor $\alpha_n$ used for calculation of the quantization step value Q of the second stream will be discussed. The transcoder 1 calculates the quantization step conversion factor $\alpha_{n+1}$ after a lapse of the n period.

Eq. 11 is an equation for calculation of the quantization step conversion factor $\alpha_{n+1}$. In Eq. 11, $(T-C_n)$ is obtained by subtracting the average output bit rate $C_n$ of the converted second stream in the n period from the total target bit rate T of the second stream. This value is referred to as a coefficient of variation. In Eq. 11, "k" represents an adjustment factor used for adjusting the coefficient of variation and is a positive value.

$$\alpha_{n+1} = k * (T - C_n) + \alpha_1 \quad \text{(Eq. 11)}$$

Thus, the ratio of the quantization step values is adjusted toward a target by adding the coefficient of variation to the initial value $\alpha_1$ obtained by Eq. 6. In this meaning, the initial value $\alpha_1$ of the quantization step conversion factor can be referred to as a reference conversion factor.

After obtaining the quantization step conversion factor $\alpha_{n+1}$ by using Eq. 11, the quantization step value Q of the second stream in the (n+1) period is obtained by using Eq. 5.

For the above calculation of the coefficient of variation in Eq. 11, the average output bit rate $C_n$ in the n period is used. Herein, as shown in Eq. 12, the average period bit rate $AC_n(M)$ from the (n−M+1) period to the n period may be used, instead of the average output bit rate $C_n$.

$$\alpha_{n+1} = k*(T-AC_n(M))+\alpha_1 \quad \text{(Eq. 12)}$$

With Eq. 12, it is possible to gently control the coefficient of variation, without largely depending on local variation of the average output bit rate $C_n$. As discussed above, as the average period bit rate $AC_n(M)$, any one of the three average period bit rates $AC_n(M1)$, $AC_n(M2)$ and $AC_n(M3)$ which are calculated by the average value calculation part 7 is selected. In other words, by selecting any one period of M1, M2 and M3 as the buffer period, it is possible to control the speed of response in feedback control.

Further, for the above calculation of the coefficient of variation in Eq. 11, the value obtained by subtracting the average output bit rate $C_n$ of the converted second stream in the n period from the total target bit rate T of the second stream is used. Herein, as shown in Eq. 13, the value obtained by this subtraction may be further divided by the average input bit rate $S_n$ of the first stream in the n period.

$$\alpha_{n+1} = k*\left(\frac{T-C_n}{S_n}\right) + \alpha_1 \quad \text{(Eq. 13)}$$

With Eq. 13, even if the bit rate of the first stream locally varies significantly, it is possible to avoid a large effect of this on the coefficient of variation.

Further, both the ideas for the methods of calculating the coefficient of variation by using Eqs. 12 and 13 may be taken. Specifically, as shown in Eq. 14, the average period bit rate $AC_n(M)$ is used instead of the average output bit rate $C_n$ and the value obtained by subtraction is divided by the average input bit rate $S_n$. With this, it is possible to more gently control the coefficient of variation.

$$\alpha_{n+1} = k*\left(\frac{T-AC_n(M)}{S_n}\right) + \alpha_1 \quad \text{(Eq. 14)}$$

In Eq. 13, the value obtained by subtracting the average output bit rate $C_n$ from the total target bit rate T is divided by the average input bit rate $S_n$. Instead of this, as shown in Eq. 15, the value obtained by subtraction may be divided by the average period bit rate $AS_n(M)$ of the first stream from the (n−M+1) period to the n period. With this method, it is possible to more gently control the coefficient of variation without any effect of local variation of the bit rate of the first stream. As discussed above, as the average period bit rate $AS_n(M)$, any one of the three average period bit rates $AS_n(M1)$, $AS_n(M2)$ and $AS_n(M3)$ which are calculated by the average value calculation part 5 is selected. In other words, by selecting any one period of M1, M2 and M3 as the buffer period, it is possible to control the speed of response in the feedback control.

$$\alpha_{n+1} = k*\left(\frac{T-C_n}{AS_n(M)}\right) + \alpha_1 \quad \text{(Eq. 15)}$$

Further, as shown in Eq. 16, the average period bit rate $AC_n(M)$ may be used instead of the average output bit rate $C_n$ and the average period bit rate $AS_n(M)$ may be used instead of the average input bit rate $S_n$. With this, it is possible to more gently control the coefficient of variation.

$$\alpha_{n+1} = k*\left(\frac{T-AC_n(M)}{AS_n(M)}\right) + \alpha_1 \quad \text{(Eq. 16)}$$

<2-2. Rate Control Method (B)>

Next, the rate control method (B) will be discussed. Also in the rate control method (B), the quantization step conversion factor is calculated and by using Eq. 5, the quantization step value Q of the second stream is calculated. The method of calculating the quantization step conversion factor, however, is different from that in the rate control method (A). In the rate control method (A), the initial value $\alpha_1$ of the quantization step conversion factor is obtained and by using the initial value $\alpha_1$ as the reference conversion factor, the variations from the reference conversion factor are sequentially obtained. On the other hand, in the rate control method (B), at the point of time when the n period is finished, a target setting bit rate $T_{n+1}$ of the second stream in the (n+1) period is determined and by using the determined target setting bit rate $T_{n+1}$, the quantization step conversion factor $\alpha_{n+1}$ in the (n+1) period is calculated.

After determining the target setting bit rate $T_{n+1}$ in the (n+1) period, the quantization step conversion factor $\alpha_{n+1}$ is calculated by the same method as that using Eq. 7. Specifically, by using the function f shown in Eqs. 8 to 10, the quantization step conversion factor $\alpha_{n+1}$ is calculated. More specifically, as shown Eq. 17, by substituting the ratio between the target setting bit rate $T_{n+1}$ in the (n+1) period and the average input bit rate $S_n$ in the n period into the function f, the quantization step conversion factor $\alpha_{n+1}$ is calculated.

$$\alpha_{n+1} = f(T_{n+1}/S_n) \quad \text{(Eq. 17)}$$

Alternatively, as shown in Eq. 18, by using the average period bit rate $AS_n(M)$ from the (n−M+1) period to the n period, instead of the average input bit rate $S_n$ in the n period, the quantization step conversion factor $\alpha_{n+1}$ may be calculated. As discussed above, as the average period bit rate $AS_n(M)$, any one of the three average period bit rates $AS_n(M1)$, $AS_n(M2)$ and $AS_n(M3)$ which are calculated by the average value calculation part 5 is selected. By selecting any one period of M1, M2 and M3 as the buffer period, it is possible to control the speed of response in the feedback control.

$$\alpha_{n+1} = f(T_{n+1}/AS_n(M)) \quad \text{(Eq. 18)}$$

Eq. 19 is an equation for calculation of the target setting bit rate $T_{n+1}$ in the (n+1) period. In other words, it represents the target setting bit rate $T_{n+1}$ in the (n+1) period calculated by the transcoder 1 at the point of time when the n period is finished. Specifically, assuming that a value obtained by dividing the average output bit rate $C_n$ of the converted second stream in the n period by the target setting bit rate $T_n$ in the n period is determined as a target ratio, the target setting bit rate $T_{n+1}$ in the (n+1) period can be calculated by dividing the total target bit rate T of the second stream by the target ratio.

$$T_{n+1} = k * \frac{T}{\frac{C_n}{T_n}}$$ (Eq. 19)

In Eq. 19, "k" is a positive factor and a factor for adjusting the target setting bit rate $T_{n+1}$. Thus, the ratio (target ratio) between the bit rate and the target in the n period is calculated by $C_n/T_n$ and then the total target bit rate T is divided by the target ratio to adjust the target setting bit rate $T_{n+1}$ in the (n+1) period, thereby controlling the bit rate to approximate the target bit rate on the whole.

Though the value obtained by dividing the average output bit rate $C_n$ of the second stream in the n period by the target setting bit rate $T_n$ is used as the target ratio in Eq. 19, this target ratio is further adjusted in Eq. 20.

$$T_{n+1} = k * \frac{T}{\frac{S_{n-1}}{S_n} * \frac{C_n}{T_n}}$$ (Eq. 20)

In Eq. 20, the target ratio is multiplied by $S_{n-1}/S_n$. This multiplier factor $S_{n-1}/S_n$ is a value obtained by dividing the average input bit rate $S_{n-1}$ of the first stream in the (n−1) period by the average input bit rate $S_n$ of the first stream in the n period and may be referred to as a period ratio of the average input bit rate. Multiplying the target ratio by the period ratio can adjust the target ratio.

Thus, multiplying the target ratio by the period ratio can correct the local variation of the target ratio. For example, if the average input bit rate $S_n$ locally becomes smaller, sometimes the target ratio $C_n/T_n$ accordingly becomes smaller. Also in such a case, multiplying the target ratio $C_n/T_n$ by the period ratio $S_{n-1}/S_n$ (the period ratio is larger than 1 in this case) makes it possible to adjust the target ratio and avoid large variation of the target setting bit rate $T_{n+1}$. Conversely, if the average input bit rate $S_n$ locally becomes larger, the period ratio $S_{n-1}/S_n$ is smaller than 1 and this suppresses sharp increase of the target ratio.

In Eq. 20, the value obtained by dividing the average input bit rate $S_{n-1}$ of the first stream in the (n−1) period by the average input bit rate $S_n$ of the first stream in the n period is used as the period ratio. On the other hand, in the case where the average input bit rate $S_{n+1}$ of the first stream in the (n+1) period can be prefetched, the average input bit rate $S_{n+1}$ may be used. The case where the average input bit rate $S_{n+1}$ can be prefetched is a case where there is enough time to buffer the information on the average input bit rate $S_{n+1}$ and then calculate the target setting bit rate $T_{n+1}$ in the (n+1) period. In other words, this is a case where some processing delay is allowed. Eq. 21 is an equation for calculation of the target setting bit rate $T_{n+1}$ by using the average input bit rate $S_{n+1}$.

$$T_{n+1} = k * \frac{T}{\frac{S_n}{S_{n+1}} * \frac{C_n}{T_n}}$$ (Eq. 21)

As shown in Eq. 21, as the period ratio used is $S_n/S_{n+1}$, that is, a value obtained by dividing the average input bit rate $S_n$ of the first stream in the n period by the average input bit rate $S_{n+1}$ of the first stream in the (n+1) period. Thus, by using the average input bit rate $S_{n+1}$ of the first stream in the (n+1) period, it is possible to control the target setting bit rate $T_{n+1}$ with higher precision. In other words, it is possible to optimally control the target bit rate by using the latest input information.

In a case where the average input bit rate $S_{n+1}$ of the first stream in the (n+1) period is used as the period ratio, as shown in Eq. 22, instead of Eq. 17, the quantization step conversion factor $\alpha_{n+1}$ in the (n+1) period can be calculated by substituting the ratio between the target setting bit rate $T_{n+1}$ in the (n+1) period and the average input bit rate $S_{n+1}$ in the (n+1) period into the function f.

$$\alpha_{n+1} = f(T_{n+1}/S_{n+1})$$ (Eq. 22)

Further, in Eq. 20, $S_{n-1}/S_n$ is used as the period ratio. Instead of $S_{n-1}/S_n$, the ratio between the average period bit rate $AS_{n-1}(M)$ of past M periods including the (n−1) period and the average period bit rate $AS_n(M)$ of past M periods including the n period may be used as the period ratio. In other words, in Eq. 20, $AS_{n-1}(M)/AS_n(M)$ may be used, instead of $S_{n-1}/S_n$, as the period ratio. With this, it is possible to decrease the effect of local variation and optimally control the target setting bit rate $T_{n+1}$.

Alternatively, if the average input bit rate $S_{n+1}$ of the first stream in the (n+1) period can be prefetched, the ratio between the average period bit rate $AS_n(M)$ of past M periods including the n period and the average period bit rate $AS_{n+1}(M)$ of past M periods including the (n+1) period may be used as the period ratio. In other words, in Eq. 20, $AS_n(M)/AS_{n+1}(M)$ may be used, instead of $S_{n-1}/S_n$, as the period ratio. With this, it is possible to decrease the effect of local variation and control the target setting bit rate $T_{n+1}$ with higher precision by using the latest input bit rate.

In a case where the average period bit rate $AS_{n+1}(M)$ of past M periods including the (n+1) period is used as the period ratio, as shown in Eq. 23, instead of Eq. 18, the quantization step conversion factor $\alpha_{n+1}$ in the (n+1) period can be calculated by substituting the ratio between the target setting bit rate $T_{n+1}$ in the (n+1) period and the average period bit rate $AS_{n+1}(M)$ of past M periods including the (n+1) period into the function f.

$$\alpha_{n+1} = f(T_{n+1}/AS_{n+1}(M))$$ (Eq. 23)

Further, though the method of calculating the target setting bit rate $T_{n+1}$ of the rate control method (B) has been discussed by using Eqs. 19, 20, 21 and the like, in all the cases discussed in the above rate control method (B) including the case discussed by using these equations, the average period bit rate $AC_n(M)$ from the (n−M+1) period to the n period may be used instead of the average output bit rate $C_n$ in the n period. For example, in Eqs. 19, 20, 21 and the like, $AC_n(M)$ is used instead of $C_n$. Eq. 24 is an equation for calculation of the target setting bit rate $T_{n+1}$ in the (n+1) period in the case where the average period bit rate $AC_n(M)$ is used instead of the average output bit rate $C_n$ in Eq. 19. This makes it possible to more gently control the target setting bit rate $T_{n+1}$. As discussed above, as the average period bit rate $AC_n(M)$, any one of the three average period bit rates $AC_n(M1)$, $AC_n(M2)$ and $AC_n(M3)$ which are calculated by the average value calculation part 7 is selected. In other words, by selecting any one period of M1, M2 and M3 as the buffer period, it is possible to control the speed of response in the feedback control.

$$T_{n+1} = k * \frac{T}{\frac{AC_n(M)}{T_n}}$$ (Eq. 24)

<2-3. Rate Control Method (C)>

Next, the rate control method (C) will be discussed. Also in the rate control method (C), the quantization step conversion factor is calculated, and by using Eq. 5, the quantization step value Q of the second stream is calculated. Further, in the rate control method (C), like in the rate control method (B), the target setting bit rate $T_{n+1}$ of the second stream in the (n+1) period is determined at the point of time when the n period is finished, and by using the determined target setting bit rate $T_{n+1}$, the quantization step conversion factor $\alpha_{n+1}$ in the (n+1) period is calculated.

After determining the target setting bit rate $T_{n+1}$ in the (n+1) period, the quantization step conversion factor $\alpha_{n+1}$ is calculated in the same method as that discussed by using Eq. 7. In other words, by using the function f shown in Eqs. 8 to 10, the quantization step conversion factor $\alpha_{n+1}$ is calculated. Specifically, as shown in Eq. 17, the quantization step conversion factor $\alpha_{n+1}$ is calculated by substituting the ratio between the target setting bit rate $T_{n+1}$ in the (n+1) period and the average input bit rate $S_n$ in the n period into the function f. Alternatively, as shown in Eq. 18, the quantization step conversion factor $\alpha_{n+1}$ may be calculated by using the average period bit rate $AS_n(M)$ from the (n−M+1) period to the n period, instead of the average input bit rate $S_n$. If the average period bit rate $AS_n(M)$ is used, by selecting any one period of M1, M2 and M3 as the buffer period, it is possible to control the speed of response in the feedback control.

Eq. 25 is an equation for calculation of the target setting bit rate $T_{n+1}$ in the (n+1) period. In other words, it represents the target setting bit rate $T_{n+1}$ in the (n+1) period calculated by the transcoder 1 at the point of time when the n period is finished. Specifically, assuming that a value obtained by subtracting the average output bit rate $C_n$ of the converted second stream in the n period from the target setting bit rate $T_n$ in the n period is determined as a target difference, the target setting bit rate $T_{n+1}$ in the (n+1) period can be calculated by adding the target difference to the total target bit rate T of the second stream.

$$T_{n+1} = T + k*(T_n - C_n) \quad \text{(Eq. 25)}$$

In Eq. 25, "k" is a positive factor and a factor for adjusting the target setting bit rate $T_{n+1}$. Thus, the difference between the bit rate and the target in the n period is calculated by $(T_n - C_n)$ and then the target difference is added to the total target bit rate T, to thereby control the output stream to approximate the target bit rate.

Though the value obtained by subtracting the average output bit rate $C_n$ of the second stream in the n period from the target setting bit rate $T_n$ in the n period is used as the target difference in Eq. 25, this target difference is further adjusted in Eq. 26.

$$T_{n+1} = T + k * \frac{S_n}{S_{n-1}} * (T_n - C_n) \quad \text{(Eq. 26)}$$

In Eq. 26, the target difference is multiplied by $S_n/S_{n-1}$. This multiplier factor $S_n/S_{n-1}$ is the period ratio obtained by dividing the average input bit rate $S_n$ of the first stream in the n period by the average input bit rate $S_{n-1}$ of the first stream in the (n−1) period. Multiplying the target difference by the period ratio can adjust the target difference.

Thus, multiplying the target difference by the period ratio can correct the local variation of the target difference. For example, if the average input bit rate $S_n$ in the n period locally becomes smaller than that in the (n−1) period, sometimes the target difference $(T_n - C_n)$ accordingly varies largely. Also in such a case, multiplying the target difference $(T_n - C_n)$ by the period ratio $S_n/S_{n-1}$ (the period ratio is smaller than 1 in this case) makes it possible to adjust the target difference and avoid large variation of the target setting bit rate $T_{n+1}$.

In Eq. 26, the value obtained by dividing the average input bit rate $S_n$ of the first stream in the n period by the average input bit rate $S_{n-1}$ of the first stream in the (n−1) period is used as the period ratio. On the other hand, in the case where the average input bit rate $S_{n+1}$ of the first stream in the (n+1) period can be prefetched, the average input bit rate $S_{n+1}$ may be used. The case where the average input bit rate $S_{n+1}$ can be prefetched is, as discussed above, a case where there is enough time to buffer the information on the average input bit rate $S_{n+1}$ and then calculate the target setting bit rate $T_{n+1}$ in the (n+1) period. In this case, in Eq. 26, $S_{n+1}/S_n$ is used, instead of $S_n/S_{n-1}$, as the period ratio. Thus, by using the average input bit rate $S_{n+1}$ of the first stream in the (n+1) period, it is possible to control the target setting bit rate $T_{n+1}$ with higher precision.

In a case where the average input bit rate $S_{n+1}$ of the first stream in the (n+1) period is used as the period ratio, as shown in Eq. 22, instead of Eq. 17, the quantization step conversion factor $\alpha_{n+1}$ in the (n+1) period can be calculated by substituting the ratio between the target setting bit rate $T_{n+1}$ in the (n+1) period and the average input bit rate $S_{n+1}$ in the (n+1) period into the function f.

Further, in Eq. 26, $S_n/S_{n-1}$ is used as the period ratio. Instead of $S_n/S_{n-1}$, the ratio between the average period bit rate $AS_n(M)$ of past M periods including the n period and the average period bit rate $AS_{n-1}(M)$ of past M periods including the (n−1) period may be used as the period ratio. In other words, in Eq. 26, $AS_n(M)/AS_{n-1}(M)$ may be used, instead of $S_n/S_{n-1}$, as the period ratio. With this, it is possible to decrease the effect of local variation and optimally control the target setting bit rate $T_{n+1}$.

Alternatively, if the average input bit rate $S_{n+1}$ of the first stream in the (n+1) period can be prefetched, the ratio between the average period bit rate $AS_{n+1}(M)$ of past M periods including the (n+1) period and the average period bit rate $AS_n(M)$ of past M periods including the n period may be used as the period ratio. In other words, in Eq. 26, $AS_{n+1}(M)/AS_n(M)$ may be used, instead of $S_n/S_{n-1}$, as the period ratio. With this, it is possible to decrease the effect of local variation and control the target setting bit rate $T_{n+1}$ with higher precision by using the latest input bit rate.

In a case where the average period bit rate $AS_{n+1}(M)$ of past M periods including the (n+1) period is used as the period ratio, as shown in Eq. 23, instead of Eq. 18, the quantization step conversion factor $\alpha_{n+1}$ in the (n+1) period can be calculated by substituting the ratio between the target setting bit rate $T_{n+1}$ in the (n+1) period and the average period bit rate $AS_{n+1}(M)$ of past M periods including the (n+1) period into the function f.

Further, though the method of calculating the target setting bit rate $T_{n+1}$ of the rate control method (C) has been discussed by using Eqs. 25, 26 and the like, in all the calculation methods discussed in the rate control method (C) including the cases discussed by using these equations, the average period bit rate $AC_n(M)$ from the (n−M+1) period to the n period may be used instead of the average output bit rate $C_n$ in the n period. For example, in Eqs. 25, 26 and the like, $AC_n(M)$ may be used instead of $C_n$. Eq. 27 is an equation for calculation of the target setting bit rate $T_{n+1}$ in the case where the average period bit rate $AC_n(M)$ is used instead of the average output bit rate $C_n$ in Eq. 25. This makes it possible to more gently control the target setting bit rate $T_{n+1}$. Then, by selecting any one period of M1, M2 and M3 as the buffer period, it is possible to control the speed of response in the feedback control.

$$T_{n+1}=T+k*(T_n-AC_n(M)) \quad \text{(Eq. 27)}$$

<2-4. Rate Control Method (D)>

Next, the rate control method (D) will be discussed. Also in the rate control method (D), like in the rate control method (C), the target setting bit rate $T_{n+1}$ of the second stream in the (n+1) period is determined at the point of time when the n period is finished, and by using the determined target setting bit rate $T_{n+1}$, the quantization step conversion factor $\alpha_{n+1}$ in the (n+1) period is calculated. In the rate control method (D), the method of determining the target setting bit rate $T_{n+1}$ of the second stream in the (n+1) period is different from that of the rate control method (C).

Eq. 28 is an equation for calculation of the target setting bit rate $T_{n+1}$ in the (n+1) period. Like in the rate control method (C), the value obtained by subtracting the average output bit rate $C_n$ of the converted second stream in the n period from the target setting bit rate $T_n$ in the n period is used as the target difference. Though the target difference is adjusted, however, by multiplying the target difference by the period ratio in the rate control method (C), the target difference is multiplied by a period difference in the rate control method (D), as shown in Eq. 28.

$$T_{n+1}=T+k*(S_n-S_{n-1})*(T_n-C_n) \quad \text{(Eq. 28)}$$

In Eq. 28, the target difference is multiplied by $(S_n-S_{n-1})$. This multiplier factor $(S_n-S_{n-1})$ is the period difference obtained by subtracting the average input bit rate $S_{n-1}$ of the first stream in the (n−1) period from the average input bit rate $S_n$ of the first stream in the n period. Multiplying the target difference by the period difference can adjust the target difference. In Eq. 28, the factor "k" is a positive factor for adjusting the target setting bit rate $T_{n+1}$.

Thus, multiplying the target difference by the period difference can correct the local variation of the target difference. For example, if the average input bit rate $S_n$ gradually becomes smaller, sometimes the average output bit rate $C_n$ accordingly becomes smaller and target difference $(T_n-C_n)$ becomes a positive value. Also in such a case, the period difference $(S_n-S_{n-1})$ becomes a negative value, to thereby make such a correction that the target setting bit rate $T_{n+1}$ should not be set larger. In other words, if the average input bit rate $S_n$ becomes smaller, contrary to this variation, the target setting bit rate $T_{n+1}$ is controlled not to become larger.

In the method of calculating the target setting bit rate $T_{n+1}$ discussed by using Eq. 28, the target difference $(T_n-C_n)$ is multiplied by the period difference. On the other hand, as shown in Eq. 29, the period difference may be added to the target difference. In Eq. 29, "h" is a positive factor for adjusting the target setting bit rate $T_{n+1}$. Thus, by adding the period difference to the target difference, it is possible to control the target setting bit rate $T_{n+1}$ with a feature different from that in the case of multiplication.

$$T_{n+1}=T+h*(S_n-S_{n-1})+k*(T_n-C_n) \quad \text{(Eq. 29)}$$

In Eq. 28, the value obtained by subtracting the average input bit rate $S_{n-1}$ of the first stream in the (n−1) period from the average input bit rate $S_n$ of the first stream in the n period is used as the period difference. Then, the target difference is multiplied by the period difference. On the other hand, in the case where the average input bit rate $S_{n+1}$ of the first stream in the (n+1) period can be prefetched, the average input bit rate $S_{n+1}$ may be used. In this case, in Eq. 28, $(S_{n+1}-S_n)$ is used, instead of $(S_n-S_{n-1})$, as the period difference. Thus, by using the average input bit rate $S_{n+1}$ of the first stream in the (n+1) period, it is possible to control the target setting bit rate $T_{n+1}$ with higher precision.

Also in Eq. 29, the value obtained by subtracting the average input bit rate $S_{n-1}$ of the first stream in the (n−1) period from the average input bit rate $S_n$ of the first stream in the n period is used as the period difference. Then, the period difference is added to the target difference. On the other hand, in the case where the average input bit rate $S_{n+1}$ of the first stream in the (n+1) period can be prefetched, the average input bit rate $S_{n+1}$ may be used. In this case, in Eq. 29, $(S_{n+1}-S_n)$ is used, instead of $(S_n-S_{n-1})$, as the period difference. Thus, by using the average input bit rate $S_{n+1}$ of the first stream in the (n+1) period, it is possible to control the target setting bit rate $T_{n+1}$ with higher precision.

In a case where the average input bit rate $S_{n+1}$ of the first stream in the (n+1) period is used as the period difference, as shown in Eq. 22, the quantization step conversion factor $\alpha_{n+1}$ in the (n+1) period can be calculated by substituting the ratio between the target setting bit rate $T_{n+1}$ in the (n+1) period and the average input bit rate $S_{n+1}$ in the (n+1) period into the function f.

In Eqs. 28 and 29, $(S_n-S_{n-1})$ is used as the period difference. Instead of this period difference, the difference between the average period bit rate $AS_n(M)$ of past M periods including the n period and the average period bit rate $AS_{n-1}(M)$ of past M periods including the (n−1) period may be used as the period difference. In other words, in Eqs. 28 and 29, $(AS_n(M)-AS_{n-1}(M))$ may be used, instead of $(S_n-S_{n-1})$, as the period difference. With this, it is possible to decrease the effect of local variation and optimally control the target setting bit rate $T_{n+1}$. Then, by selecting any one period of M1, M2 and M3 as the buffer period, it is possible to control the speed of response in the feedback control.

Alternatively, if the average input bit rate $S_{n+1}$ of the first stream in the (n+1) period can be prefetched, the ratio between the average period bit rate $AS_{n+1}(M)$ of past M periods including the (n+1) period and the average period bit rate $AS_n(M)$ of past M periods including the n period may be used as the period difference. In other words, in Eqs. 28 and 29, $(AS_{n+1}(M)-AS_n(M))$ may be used, instead of $(S_n-S_{n-1})$, as the period difference. With this, it is possible to decrease the effect of local variation and control the target setting bit rate $T_{n+1}$ with higher precision by using the latest input bit rate.

In a case where the average period bit rate $AS_{n+1}(M)$ of past M periods including the (n+1) period is used as the period difference, as shown in Eq. 23, the quantization step conversion factor $\alpha_{n+1}$ in the (n+1) period can be calculated by substituting the ratio between the target setting bit rate $T_{n+1}$ in the (n+1) period and the average period bit rate $AS_{n+1}(M)$ of past M periods including the (n+1) period into the function f.

Further, though the method of calculating the target setting bit rate $T_{n+1}$ of the rate control method (D) has been discussed by using Eqs. 28, 29 and the like, in all the calculation methods discussed in the rate control method (D) including the cases discussed by using these equations, the average period bit rate $AC_n(M)$ from the (n−M+1) period to the n period may be used instead of the average output bit rate $C_n$ in the n period. Eq. 30 is an equation for calculation of the target setting bit rate $T_{n+1}$ in the case where the average period bit rate $AC_n(M)$ is used instead of the average output bit rate $C_n$ in Eq. 28. Eq. 31 is an equation for calculation of the target setting bit rate $T_{n+1}$ in the case where the average period bit rate $AC_n(M)$ is used instead of the average output bit rate $C_n$ in Eq. 29. This makes it possible to more gently control the target setting bit rate $T_{n+1}$. Then, by selecting any one period of M1, M2 and M3 as the buffer period, it is possible to control the speed of response in the feedback control.

$$T_{n+1}=T+k*(S_n-S_{n-1})*(T_n-AC_n(M)) \quad \text{(Eq. 30)}$$

$$T_{n+1}=T+h*(S_n-S_{n-1})+k*(T_n-AC_n(M)) \quad \text{(Eq. 31)}$$

{3. Method of Selecting the Average Period Bit Rate $AS_n(M)$ or $AC_n(M)$}

As discussed above, in the rate control methods (A) to (D), the encoder 3 calculates the quantization step value Q by using the average period bit rate $AS_n(M)$ or $AC_n(M)$ as a parameter in various manners.

Then, also as discussed above, when the average period bit rate $AS_n(M)$ is used as the parameter, the encoder 3 selects any one of the average period bit rates $AS_n(M1)$, $AS_n(M2)$ and $AS_n(M3)$ and uses the selected average value as a parameter for calculation of the quantization step value Q. When the average period bit rate $AC_n(M)$ is used as the parameter, the encoder 3 selects any one of the average period bit rates $AC_n(M1)$, $AC_n(M2)$ and $AC_n(M3)$ and uses the selected average value as the parameter for calculation of the quantization step value Q.

In a case of using the average period bit rate $AS_n(M1)$ or $AC_n(M1)$ as the parameter, the response time of feedback in the code amount control is set short. In other words, it is a control with emphasis on making the bit rate constant, which is close to the so-called CBR (Constant Bit Rate) control.

On the other hand, in a case of using the average period bit rate $AS_n(M3)$ or $AC_n(M3)$ as the parameter, the response time of feedback in the code amount control is set long. In other words, it is a control with emphasis on image quality, which is close to the so-called VBR (Variable Bit Rate) control.

In a case of using the average period bit rate $AS_n(M2)$ or $AC_n(M2)$ as the parameter, it is a control having a medium feature between the above two controls.

The encoder 3 switches these average period bit rates $AS_n(M)$ or $AC_n(M)$ used as the parameter in accordance with the conditions while performing the encoding operation. Specifically, the encoder 3 switches the buffer period among M1, M2 and M3, which is used for calculation of the average period bit rate $AS_n(M)$ or $AC_n(M)$.

If the variation in the amount of codes of the output stream becomes sharp, for example, the encoder 3 selects the average period bit rate $AS_n(M3)$ or $AC_n(M3)$ as the average period bit rate $AS_n(M)$ or $AC_n(M)$. In other words, this is a case where the average output bit rate $C_n$ oscillates up and down with respect to the target bit rate T. In such a case, by lengthening the calculation period of the average period bit rate $AS_n(M)$ or $AC_n(M)$, the control is so made as to absorb the oscillation of the average output bit rate $C_n$.

If degradation of the image quality of the output stream is significant, for example, the encoder 3 selects the average period bit rate $AS_n(M3)$ or $AC_n(M3)$ as the average period bit rate $AS_n(M)$ or $AC_n(M)$. In other words, this is a case where the S/N (signal-to-noise) ratio between the image of the input stream and the image of the output stream becomes smaller. In such a case, by lengthening the calculation period of the average period bit rate $AS_n(M)$ or $AC_n(M)$, the control is so made as to keep the bit rate for a relatively longer period constant, and for the period, some degree of freedom is given to the bit rate and priority is given to the image quality.

If there is some margin in the band of the channel, by keeping the bit rate for a relatively longer period constant, some degree of freedom is given to the bit rate for the period and priority is given to the image quality. Specifically, the encoder 3 selects the average period bit rate $AC_n(M3)$ or $AC_n(M3)$ as the average period bit rate $AS_n(M)$ or $AC_n(M)$.

On the other hand, there is not any margin in the band of the channel, it is necessary to keep the bit rate for a short period constant in order to give priority to smooth communication. Specifically, the encoder 3 selects the average period bit rate $AS_n(M1)$ or $AC_n(M1)$ as the average period bit rate $AS_n(M)$ or $AC_n(M)$.

If the condition of the band of the channel is not the same as either of those in the above two cases and is medium one between the above two conditions, the average period bit rate $AS_n(M2)$ or $AC_n(M2)$ may be selected.

In order to perform such controls, the transcoder 1 has only to comprise a function to detect the condition of the band of the channel. The encoder 3 compares the condition of the band of the channel with a predetermined condition and adaptively selects the parameter to be used as the average period bit rate $AS_n(M)$ or $AC_n(M)$ in accordance with the situation.

Further, if there is a high level of requirement for image quality from the user, it is necessary to keep the bit rate for a relatively longer period constant in order to give some degree of freedom to the bit rate for the period. Specifically, the encoder 3 selects the average period bit rate $AS_n(M3)$ or $AC_n(M3)$ as the average period bit rate $AS_n(M)$ or $AC_n(M)$.

On the other hand, if there is a low level of requirement for image quality from the user, it is necessary to keep the bit rate for a short period constant in order to put emphasis on making the bit rate constant. Specifically, the encoder 3 selects the average period bit rate $AS_n(M1)$ or $AC_n(M1)$ as the average period bit rate $AS_n(M)$ or $AC_n(M)$.

If there is a medium level of requirement for image quality from the user, the encoder 3 selects the average period bit rate $AS_n(M2)$ or $AC_n(M2)$ as the average period bit rate $AS_n(M)$ or $AC_n(M)$.

The user can set the level of image quality of the output stream to the transcoder 1. The encoder 3 selects the parameter to be used as the average period bit rate $AS_n(M)$ or $AC_n(M)$ in accordance with the set value for the level of image quality which is set by the user. If the user changes the set value for the level of image quality at some midpoint in the encoding operation, the parameter to be selected is changed in accordance therewith.

Alternatively, the user may directly select the parameter to be selected as the average period bit rate $AS_n(M)$ or $AC_n(M)$.

Further, the encoder 3 may adaptively select the parameter in accordance with a free disk space. If the amount of free disk space becomes very small, for example, the encoder 3 selects the average period bit rate $AS_n(M1)$ or $AC_n(M1)$, to quickly make the bit rate constant.

Thus, in this preferred embodiment of the present invention, by making the buffer period for the amount of codes of the stream variable, it is possible to control the speed of response of the feedback control in the code amount control. Then, it thereby becomes possible to control the amount of codes while keeping the balance between the purpose of making the bit rate constant and the purpose of increasing the image quality.

Though the respective average values which are calculated for the three periods M1, M2 and M3 are used in the above-discussed preferred embodiment, this case is only one example. The respective average values for two periods may be used or the respective average values for four or more periods may be used.

Further, the average value calculation parts 5 and 7 may always each calculate the three types of average values corresponding to the periods M1, M2 and M3 and store them into a memory, or may each calculate only the average value corresponding to the selected period.

In the preferred embodiment of the present invention, the buffer period for the amount of codes of the stream is made variable, and the average value $AS_n(M)$ or $AC_n(M)$ of the bit rates of the streams in the buffer period is used. Specifically, as shown in Eqs. 1 to 4, the average value of the average input bit rates $S_n$ or the average value of the average output bit rates $C_n$ is used as a reference value in the buffer period. As another example, a median or a weighted average value of the bit rates may be used as the reference value in the buffer period. If the median is used, the median of the average input bit rates $S_n$ or the average output bit rates $C_n$ from the (n−M+1) period to the n period is used as the reference value. If the weighted average value is used, for example, a higher weight is given to the bit rate in a period closer to the n period, and the average value of the bit rates is obtained. Also in a case where any one of other reference values is used, like in the above-discussed preferred embodiment, by setting a different period as the buffer period in accordance with a predetermined condition or by a user's operation, it is possible to control the speed of response of the feedback control.

While the invention has been shown and described in detail, the foregoing description is in all aspects illustrative and not restrictive. It is therefore understood that numerous modifications and variations can be devised without departing from the scope of the invention.

What is claimed is:

1. A transcoder for converting a first stream into a second stream, comprising:
   a bit rate acquisition device configured to acquire an average bit rate $S_k$ (k is a natural number) of a first stream in a control unit time $L_k$;
   a buffer configured to store average bit rates $S_n, S_{n-1}, \ldots, S_{n-m+1}$ (M and n are natural numbers, n>M) obtained in control unit times $L_n, L_{n-1}, \ldots, L_{n-M+1}$, respectively, of the first stream in a plurality of past periods corresponding to a plurality of the control unit times, the average bit rates being acquired by the bit rate acquisition device;
   a reference value calculation device configured to determine a period within the plurality of past periods, the determined period corresponding to P control unit times composed of control unit times $L_n, L_{n-1}, \ldots, L_{n-p+1}$ (P is a natural number, P<M), as a selected period, and the reference value calculation device further configured to acquire average bit rates $S_n, S_{n-1}, S_{n-P+1}$ of the first stream in the selected period from said buffer to calculate a reference value for a bit rate of the first stream in said selected period based on the average bit rates $S_n, S_{n-1}, \ldots, S_{n-P+1}$; and
   a quantization step value calculation device configured to calculate a quantization step value of the second stream by including said reference value of bit rates of the first stream in said selected period which is calculated by said reference value calculation device as a parameter.

2. The transcoder according to claim 1, further comprising:
   a changing device to change said selected period for said reference value to be used by said quantization step value calculation device as the parameter at a midpoint in a transcoding operation.

3. The transcoder according to claim 1, further comprising:
   an operation device to specify said selected period for said reference value to be used by said quantization step value calculation device as the parameter.

4. The transcoder according to claim 2, further comprising:
   a control device configured to extend said selected period for said reference value to be used by said quantization step value calculation device as the parameter if variation in the amount of codes of the second stream exceeds a predetermined reference.

5. The transcoder according to claim 2, further comprising:
   a control device configured to extend said selected period for said reference value to be used by said quantization step value calculation device as the parameter if the image quality of a second stream becomes lower than a predetermined reference.

6. The transcoder according to claim 1, wherein said reference value includes an average value of bit rates in said selected period.

7. The transcoder according to claim 1, further comprising:
   a device to acquire a bit rate of the entire first stream;
   a device to set a target bit rate of the entire second stream;
   a device to calculate a reference conversion factor on the basis of a ratio between the target bit rate of the entire second stream and the bit rate of the entire first stream;
   a variation coefficient calculation device to calculate a coefficient of variation from the target bit rate of the entire second stream and a bit rate of the second stream converted before the N period;
   a device to calculate a period conversion factor in a next (N+1) period by adding said coefficient of variation to said reference conversion factor; and
   a device to calculate a quantization step value of the second stream in the (N+1) period by multiplying a quantization step value of the first stream in the (N+1) period by said period conversion factor,
   wherein said variation coefficient calculation device uses a reference value of the second stream in said selected period including the N period which is calculated by said reference value calculation device as a bit rate of the second stream converted before the N period.

8. The transcoder according to claim 1, further comprising:
   a device to acquire a bit rate of the entire first stream;
   a device to set a target bit rate of the entire second stream;
   a device to calculate a reference conversion factor on the basis of a ratio between the target bit rate of the entire second stream and the bit rate of the entire first stream;
   a variation coefficient calculation device to calculate a coefficient of variation from the target bit rate of the entire second stream and a bit rate of the second stream converted before the N period;
   a device to calculate a period conversion factor in the next (N+1) period by adding said coefficient of variation to said reference conversion factor; and
   a device to calculate a quantization step value of the second stream in the (N+1) period by multiplying a quantization step value of the first stream in the (N+1) period by said period conversion factor,
   wherein said variation coefficient calculation device adjusts said coefficient of variation by dividing said calculated coefficient of variation by said reference value of the first stream in said selected period including the N period which is calculated by said reference value calculation device.

9. The transcoder according to claim 1, further comprising:
   a device to set a target bit rate of the entire second stream; and
   a target bit rate determining device to determine a target bit rate of the second stream in the (N+1) period on the basis of the target bit rate of the entire second stream, a bit rate of the second stream converted before the N period and a target bit rate of the second stream in the N period,
   wherein a reference value of the second stream in said selected period including the N period is calculated by said reference value calculation device as a bit rate of a second stream converted before the N period.

10. The transcoder according to claim 9, further comprising:
a device to acquire a bit rate of the first stream before the N period;
a period conversion factor calculation device to calculate a period conversion factor in the (N+1) period on the basis of a ratio between a determined target bit rate of the second stream in the (N+1) period and a bit rate of the first stream before the N period; and
a device to calculate a quantization step value of the second stream in the (N+1) period by multiplying a quantization step value of first stream in the (N+1) period by said period conversion factor,
wherein said period conversion factor calculation device uses said reference value of the first stream in said selected period including the N period which is calculated by said reference value calculation as a bit rate of the first stream before the N period.

11. A transcoder for converting a first stream into a second stream, comprising:
a bit rate acquisition device to acquire an average bit rate $C_k$ (k is a natural number) of a converted second stream in a control unit time $L_k$;
a buffer configured to store average bit rates $C_n$, $C_{n-1}, \ldots, C_{n-M+1}$ (M and n are natural numbers, n>M) obtained in control unit times $L_n$, $L_{n-1}, \ldots, L_{n-m+1}$, respectively, of the second stream in a plurality of past periods corresponding to a plurality of the control unit times, the average bit rates being acquired by the bit rate acquisition device;
a reference value calculation device configured to determine a period within the plurality of past periods, the determined period corresponding to P control unit times composed of control unit times $L_n, L_{n-1}, \ldots, L_{n-P+1}$ (P is a natural number, P<M), as a selected period, and configured to acquire average bit rates $C_n, C_{n-1}, \ldots, C_{n-P+1}$ of the second stream in the selected period from said buffer to calculate a reference value for a bit rate of the second stream in said selected period based on the average bit rates $C_n, C_{n-1}, \ldots, C_{n-P+1}$; and
a quantization step value calculation device configured to calculate a quantization step value of the second stream by including said reference value of bit rates of the second stream in said selected period which is calculated by said reference value calculation device as a parameter.

12. The transcoder according to claim 11, further comprising:
a changing device to change said selected period for said reference value to be used by said quantization step value calculation device as the parameter at a midpoint in a transcoding operation.

13. The transcoder according to claim 11, further comprising:
an operation device to specify said selected period for said reference value to be used by said quantization step value calculation device as the parameter.

14. The transcoder according to claim 12, further comprising:
a control device to control said selected period for said reference value to be used by said quantization step value calculation device as the parameter to increase if variation in the amount of codes of the second stream exceeds a predetermined reference.

15. The transcoder according to claim 12, further comprising:
a control device to control said selected period for said reference value to be used by said quantization step value calculation device as the parameter to increase if the image quality of the second stream becomes lower than a predetermined reference.

16. The transcoder according to claim 11, wherein said reference value includes an average value of bit rates in said selected period.

17. The transcoder according to claim 11, further comprising:
a device to acquire a bit rate of the entire first stream;
a device to set a target bit rate of the entire second stream;
a device to calculate a reference conversion factor on the basis of a ratio between the target bit rate of the entire second stream and the bit rate of the entire first stream;
a variation coefficient calculation device to calculate a coefficient of variation from the target bit rate of the entire second stream and the bit rate of the second stream converted before the N period;
a device to calculate a period conversion factor in the next (N+1) period by adding said coefficient of variation to said reference conversion factor; and
a device to calculate a quantization step value of the second stream in the (N+1) period by multiplying a quantization step value of the first stream in the (N+1) period by said period conversion factor,
wherein said variation coefficient calculation device uses said reference value of the second stream in said selected period including the N period which is calculated by said reference value calculation device as the average bit rate of a second stream converted before the N period.

18. The transcoder according to claim 11, further comprising:
a device to acquire a bit rate of the entire first stream;
a device to set a target bit rate of the entire second stream;
a device to calculate a reference conversion factor on the basis of a ratio between the target bit rate of the entire second stream and the bit rate of the entire first stream;
a variation coefficient calculation device to calculate a coefficient of variation from the target bit rate of the entire second stream and a bit rate of a second stream converted before the N period;
a device to calculate a period conversion factor in the next (N+1) period by adding said coefficient of variation to said reference conversion factor; and
a device to calculate a quantization step value of the second stream in the (N+1) period by multiplying a quantization step value of the first stream in the (N+1) period by said period conversion factor,
wherein said variation coefficient calculation device adjusts said coefficient of variation by dividing said calculated coefficient of variation by said reference value of the first stream in said selected period including the N period which is calculated by said reference value calculation device.

19. The transcoder according to claim 11, further comprising:
a device to set a target bit rate of the entire second stream; and
a target bit rate determining device to determine a target bit rate of the second stream in the (N+1) period on the basis of the target bit rate of the entire second stream, a bit rate of the second stream converted before the N period, and a target bit rate of the second stream in the N period, wherein said reference value of said second stream in said selected period including the N period is calculated by said reference value calculation device as the average bit rate of the second stream converted before the N period.

20. The transcoder according to claim 19, further comprising:
- a device to acquire a bit rate of the first stream before the N period;
- a period conversion factor calculation device to calculate a period conversion factor in the (N+1) period on the basis of a ratio between a determined target bit rate of the second stream in the (N+1) period and a bit rate of the first stream before the N period; and
- a device to calculate a quantization step value of the second stream in the (N+1) period by multiplying a quantization step value of the first stream in the (N+1) period by said period conversion factor,
- wherein said period conversion factor calculation device uses a reference value of the first stream in said selected period including the N period which is calculated by said reference value calculation device as a bit rate of the first stream before the N period.

* * * * *